3,090,780
DISAZO DYES
Ermanno Gaetani, Milan, Italy, assignor to Aziende
 Colori Nazionali Affini Acna S.p.A., Milan, Italy, a
 corporation of Italy
No Drawing. Filed Apr. 14, 1960, Ser. No. 22,124
Claims priority, application Italy Dec. 15, 1959
6 Claims. (Cl. 260—186)

An object of the present invention is to provide certain new water insoluble disazo dyes comprised in the general Formula A:

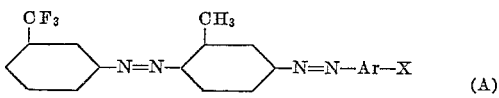

wherein Ar is selected from the group consisting of hydroxy phenyl and hydroxy naphthyl, further substituted with an alkyl group and X is selected from the group consisting of hydrogen and a dialkylsubstituted amine.

The dyes of the above mentioned general Formula A are suitable for the direct dyeing of polyolefin materials by simple application at the boiling temperature of the dyeing bath.

Among the dyes of general Formula A, the following dyes have shown to be particularly suitable for dyeing polypropylene and polyethylene materials:

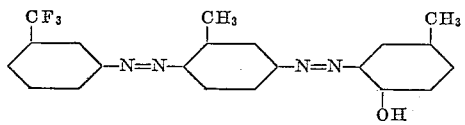

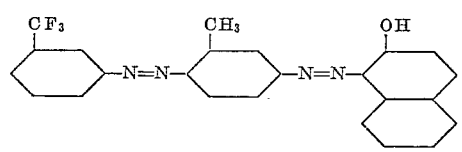

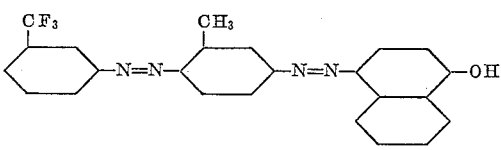

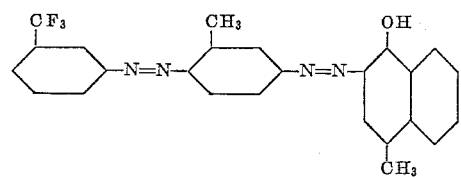

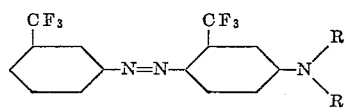

The compounds of general Formula A are obtained by coupling in the presence of a strong base, one mol of an amino azo compound of the type:

wherein R is hydrogen, with one mol of a compound of the type:

HAr—X wherein Ar and X have the above mentioned meaning.
The following examples are given to further illustrate the invention however without limiting its scope. (All parts are by wtight unless otherwise indicated.)

*Example 1*

16.1 g. m-trifluoro-methyl-aniline are diazotized in a conventional manner and are coupled with a solution of 25 g. of the sodium salt of 3-methylaniline omega-methane sulfonic acid dissolved in 300 g. water in the presence of 50 g. sodium acetate at a temperature lower than 10° C. The mono-azo dye thus obtained is filtered, washed, and suspended in 250 g. ethanol and 20 g. sodium hydroxide solution (36 Bé.) and then heated to the boiling point for 1 hour. It is then cooled, diluted with water and 4-amino-2-methyl-3'-trifluoromethyl azo-benzene is filtered and recrystallized from alcohol (meling point: 114–115° C.). 27.9 g. crystallized amino-azo compound are diazotized in 400 g. water and 35 g. hydrochloric acid solution by adding 7 g. sodium nitrite dissolved in 20 g. water, and keeping the temperature below 10° C. The diazo-azo compound thus obtained is coupled with a solution of 12 g. 4-methyl-phenol dissolved in 200 g. water and 14 g. sodium hydroxide solution, while also adding 50 g. sodium acetate, and keeping the temperature at about 10° C. When the coagulation is completed the mass is briefly heated to 60° C. The precipitated disazo dye is filtered off, washed with cold water until it is neutral, and finally dried, thus obtaining a dye in the form of a brown powder (melting point: 170° C.) corresponding to the formula:

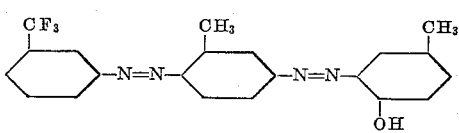

Upon examination by paper chromatography the dye gives a uniform yellow spot which turns to red by treatment with alkalies, but remains unaltered with acids.

*Example 2*

27.9 g. 4-amino-2-methyl-3'-trifluoro-methyl-azo-benzene are diazotized as in Example 1. The diazo-azo compound thus obtained is coupled with a solution of 15.5 g. β-naphthol in 100 g. water, 7 g. sodium hydroxide and 18 g. 30% ammonia. At the end of the coupling the disazo dye obtained, having the formula:

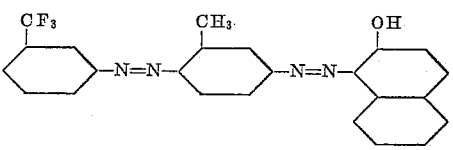

is filtered off, washed, and dried, thus obtaining a dark red powder (melting point: 201° C.). Upon examination by chromatography a uniform red spot which remains unaltered with either acids or alkalies, is noted. When β-naphthol is replaced by the same amount of α-naphthol, a dye is obtained which has the formula:

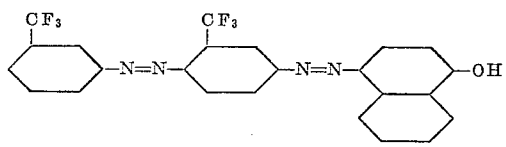

(melting point: 212° C.). Upon chromatography, this dye appears as a violet red spot which turns to blue with alkalies, but remains unaltered by acids. In contrast, by coupling with a solution of 17.5 g. 1-methyl-4-naphthol instead of the α-naphthol, the following dye is obtained under the same conditions:

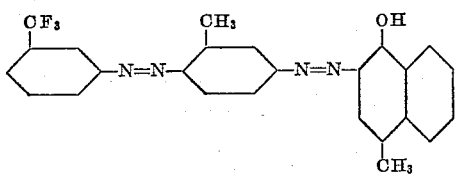

(melting point: 215° C.). Upon chromatographic examination, this forms a violet-red spot, which is more violet than that of the dye prepared using α-naphthol, but has the same chromatic reactions.

*Example 3*

27.9 g. 4-amino-2-methyl-3'-trifluoro methyl-azo-benzene are diazotized in a conventional manner and the diazo-azo compound obtained is coupled with a solution of 18 g. N,N-diethyl-meta-aminophenol in 200 g. water and 15 g. hydrochloric acid solution. After addition of the diazo compound, a 50% aqueous sodium acetate solution is gradually added until the mass does not exhibit any acid reaction with Congo red indicator.

The disazo dye obtained is filtered, washed and dried. This dye has the formula:

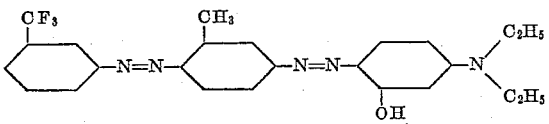

(melting point: 145° C.) gives by chromatography a uniform scarlet spot which turns to violet either with alkalies or with acids.

Having thus described my invention, what I desire to secure and to claim by Letters Patent is:

1. A disazo dye, insoluble in water, selected from the group consisting of dyes of the formulae:

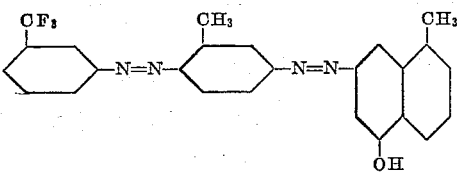

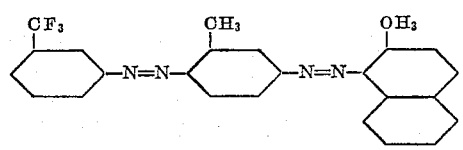

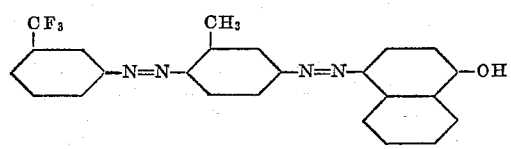

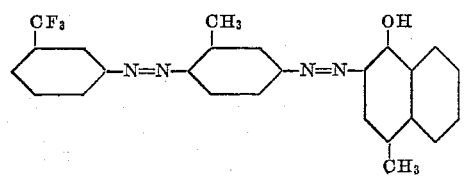

and

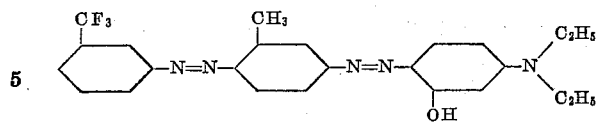

2. A disazo dye, insoluble in water, having the following formula:

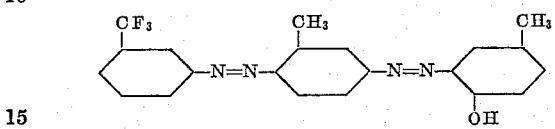

3. A disazo dye, insoluble in water, having the following formula:

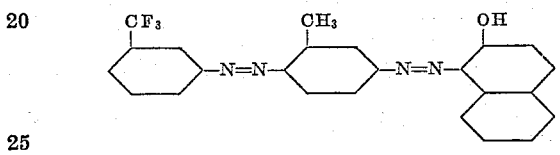

4. A disazo dye, insoluble in water, having the following formula:

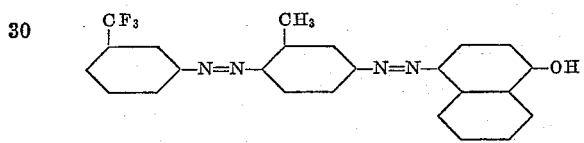

5. A disazo dye, insoluble in water, having the following formula:

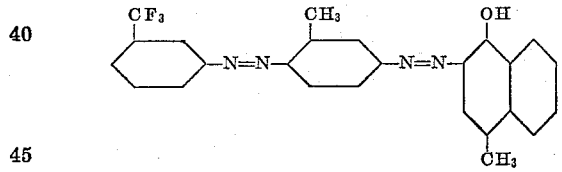

6. A disazo dye, insoluble in water, having the following formula:

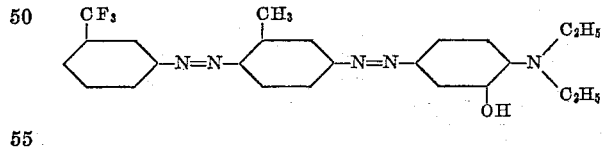

References Cited in the file of this patent

UNITED STATES PATENTS

| | | |
|---|---|---|
| 2,120,743 | Graenacher et al. | June 14, 1938 |
| 2,126,841 | Thurm | Aug. 16, 1938 |
| 2,618,630 | Dickey | Nov. 18, 1952 |

FOREIGN PATENTS

| | | |
|---|---|---|
| 200,533 | Switzerland | Jan. 2, 1939 |
| 201,838 | Switzerland | Mar. 16, 1939 |